United States Patent
Chorafakis et al.

(10) Patent No.: US 7,401,086 B2
(45) Date of Patent: Jul. 15, 2008

(54) TRANSLATING CONFIGURATION FILES AMONG NETWORK DEVICES

(75) Inventors: Dominic Chorafakis, Mississauga (CA); Vivian Lee, Scarborough (CA); Behrouz Sultanizadeh, Mississauga (CA); Gabriel Lau, North York (CA); Kelly Kanellakis, Toronto (CA)

(73) Assignee: Enterasys Networks, Inc., Andover, MA (US)

( * ) Notice: Subject to any disclaimer, the term of this patent is extended or adjusted under 35 U.S.C. 154(b) by 589 days.

(21) Appl. No.: 10/295,562

(22) Filed: Nov. 15, 2002

(65) Prior Publication Data

US 2003/0135508 A1  Jul. 17, 2003

Related U.S. Application Data

(60) Provisional application No. 60/332,100, filed on Nov. 21, 2001.

(51) Int. Cl.
*G06F 7/00* (2006.01)
*G06F 9/44* (2006.01)

(52) U.S. Cl. ................ 707/101; 707/102; 717/137

(58) Field of Classification Search .......... 707/10, 707/100, 102, 104.1, 101, 103 R, 103 X, 707/103 Y, 103 Z; 709/220, 221; 717/122, 717/121, 137, 136, 139, 140

See application file for complete search history.

(56) References Cited

U.S. PATENT DOCUMENTS

| | | | | |
|---|---|---|---|---|
| 5,995,753 A | * | 11/1999 | Walker | 717/108 |
| 5,995,975 A | * | 11/1999 | Malcolm | 707/103 R |
| 6,138,171 A | * | 10/2000 | Walker | 719/318 |
| 6,199,068 B1 | * | 3/2001 | Carpenter | 707/100 |
| 6,256,635 B1 | * | 7/2001 | Arrouye et al. | 707/102 |
| 6,308,205 B1 | * | 10/2001 | Carcerano et al. | 709/221 |
| 6,760,719 B1 | * | 7/2004 | Hanson et al. | 707/3 |
| 6,760,761 B1 | * | 7/2004 | Sciacca | 709/220 |
| 6,772,204 B1 | * | 8/2004 | Hansen | 709/220 |
| 6,826,581 B2 | * | 11/2004 | Moslander et al. | 707/203 |
| 2002/0152219 A1 | * | 10/2002 | Singh | 707/101 |
| 2003/0046381 A1 | * | 3/2003 | Mokuya et al. | 709/223 |
| 2003/0048287 A1 | * | 3/2003 | Little et al. | 345/705 |
| 2004/0002880 A1 | * | 1/2004 | Jones | 705/7 |

* cited by examiner

*Primary Examiner*—Greta L Robinson
(74) *Attorney, Agent, or Firm*—Devine, Millimet & Branch; Paul C. Remus; Raymond I. Bruttomesso, Jr.

(57) ABSTRACT

A system and method to facilitate the translation of Command Line Interface (CLI) configuration scripts associated with a device into the corresponding equivalent CLI configuration scripts of another device. The system includes a translator and one or more data dictionaries. The translator includes a user interface module, a translator logic module to enable the translation, and a current data dictionary module for retaining a selected data dictionary. Each of the data dictionaries includes common syntax generated for a variety of CLI script types. A particular data dictionary is referenced based upon initial input from a network administrator. The translator then generates the automated translation of corresponding scripts from those scripts associated with an original device into a device having differing script requirements.

14 Claims, 4 Drawing Sheets

TRANSLATING CONFIGURATION FILES AMONG NETWORK DEVICES

RELATED APPLICATIONS

This application claims the benefit of U.S. provisional application Ser. No. 60/332,100 filed on Nov. 21, 2001, which is fully incorporated herein by reference.

TECHNICAL FIELD

The present invention relates to devices and systems to enable computer networking. More particularly, the present invention relates to the management or more specifically, the configuration, of such devices and systems. Specifically, the present invention relates to systems and methods to translate automatically the configuration commands of one type of device or system into the configuration commands of a different type of device or system.

BACKGROUND INFORMATION

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either wired or wireless. Wired connections include metal and optical fiber elements. Wireless connections include infrared and radio wave transmissions.

A plurality of interconnected computing systems having some sort of commonality represents a network. For example, individuals associated with a college campus may each have a computing device. In addition, there may be shared printers and remotely located application servers sprinkled throughout the campus. There is commonality among the individuals in that they all are associated with the college in some way. The same can be said for individuals and their computing arrangements in other environments including, for example, healthcare facilities, manufacturing sites and Internet access users. In most cases, it is desirable to permit communication or signal exchange among the various computing systems of the common group in some selectable way. The interconnection of those computing systems, as well as the devices that regulate and facilitate the exchange among the systems, represent a network. Further, networks may be interconnected together to establish internetworks.

The devices that are designed to effect computer system interconnection include, but are not limited to, routers, gateways, switches, bridges, hubs, and repeaters. There are a variety of suppliers of such devices. While the means of signal exchange has been substantially well defined through accepted standards and protocols, there remain variations in certain important aspects of individual supplier devices, such as the Command Line Interface (CLI). The CLI is the means by which a network administrator configures the particular operating attributes of one or more of the signal exchange devices associated with a network. Although the basic functioning of particular devices offered by different suppliers may be the same, the configuration commands or scripts associated with equivalent functionality often vary. For that reason, it can be difficult for a network administrator to acquire and implement network equipment from different suppliers without undertaking significant effort to ensure that the commands suitable for one device equate to the commands for a similar device from a different vendor.

Presently, the network administrator must manually translate the CLI commands associated with one supplier's device(s) to those associated with a different supplier's device(s), if configuration compatibility is desired. Alternatively, the administrator is left with the choice of using network devices from a sole source with common CLI configuration scripts. Such a choice may be undesirable if that sole source is not the most cost effective one.

Accordingly, there is a need for an improved system and related method to translate easily, and preferably substantially automatically, the configuration function of one system type to the configuration function of a different system type.

SUMMARY

It is an object of the present invention to provide a system and related method to translate configuration scripts from one format to another format in a substantially automated way. This and other objects are achieved in the present invention through the introduction and use of a script translator that is associated with one or more data dictionaries as described herein.

In accordance with one aspect of the present invention, a configuration file translation system translates at least one source configuration script for a source device to at least one destination configuration script for a destination device. The system comprises at least one data dictionary comprising a plurality of dictionary entries. Each of the dictionary entries comprising at least one source command and at least one destination command corresponding to each source command. The system also comprises a translator for reading source commands in the source configuration script, finding corresponding destination commands in the data dictionary, and translating the source commands in the source configuration script to the corresponding destination commands to create the destination configuration script.

In accordance with another aspect of the present invention, a method is provided for translating at least one source configuration script for a source device to at least one destination configuration script for a destination device. The method comprises providing a user interface for prompting a user for input and for displaying information to the user and selecting a data dictionary based on the source device and the destination device. The data dictionary describes source commands for the source device and corresponding destination commands for the destination device. A data dictionary internal representation of the data dictionary selected is created. A source configuration script including source commands for the source device is processed and the data dictionary internal representation for destination commands corresponding to the source commands in the source configuration script is accessed. A destination configuration script including the destination commands corresponding to the source commands in the source configuration script is generated.

In accordance with another aspect of the present invention, a configuration file translator comprises a user interface module for prompting a user for input during a translation process and for displaying information to the user during the translation process. A current data dictionary module creates an internal representation of information in a current data dictionary selected by the user based on a source device and a destination device. A translator logic module processes a source configuration script corresponding to the source device and accesses the current data dictionary to produce a corresponding destination configuration script for the destination device.

According to a further aspect of the present invention, a method is provided for creating a configuration file translation data dictionary for a source device and destination device. The method comprises identifying source commands used to configure the source device and identifying corresponding destination commands used to configure the destination device. Data dictionary entries are created including a text description of each of the source commands and the corresponding destination commands, wherein the data dictionary entries follow predefined syntax rules.

According to yet another aspect of the present invention, a data structure provides an internal representation of a data dictionary used in translating configuration files. The data structure comprises dictionary entry objects containing source commands and destination commands in a data dictionary and source command objects containing source commands in a source configuration script. Destination command objects include pointers to the dictionary entry objects containing the destination commands, wherein each of the destination command objects corresponds to a dictionary entry object containing a source command. Dictionary entry container objects contain the dictionary entry objects containing the source commands and the corresponding destination command objects. A dictionary object contains a sorted list of dictionary entry container objects.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
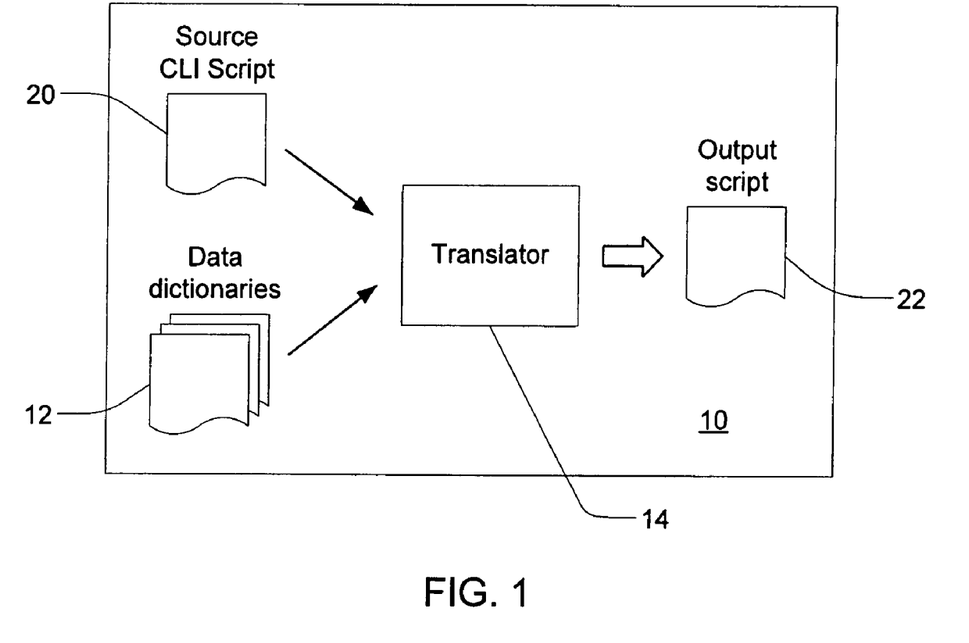
FIG. 1 is a simplified representation of the primary components of the translator system of the present invention.

The main components of a configuration file translation system 10, according to the present invention, are shown in FIG. 1. The system 10 generally includes one or more data dictionaries 12 and a translator 14, as will be described in greater detail below. The system 10 interfaces between a source device having one or more existing source configuration scripts 20 and a destination device requiring the translation of the source configuration script(s) 20. The system 10 translates source commands in the source configuration script(s) 20 into destination commands in one or more output or destination configuration scripts 22.

The system 10 can include any number of the data dictionaries 12. Each of the data dictionaries 12 preferably contains the information needed by the translator 14 to convert the source script 20 for one specific source device to the destination script 22 for one specific destination device. For example, if there is a product X that has 2 versions, and there is a desire to translate scripts from both X.1 and X.2 to be usable for a product Y, there would be 2 data dictionaries: X.1—>Y and X.2—>Y. There is no limit on the number of data dictionaries (and therefore devices) the translator 14 can support, provided there is a meaningful way for a user to select the correct dictionary to use for a particular script translation. In the describing the translation of a script from a device X for use on a device Y, the device X is referred to herein as the "source device" and device Y is referred to herein as the "destination device."

The data dictionaries 12 are preferably used in combination with the translator 14 but may also be used independently to facilitate manual translation, if desired. Moreover, the data dictionaries 12 may be plain text or encrypted text. In addition, the data dictionaries 12 may be supplied by the supplier of the translator 14 or they may alternatively be generated by the user and then compiled with the translator 14. The translator 14 can be a standalone application or a sub-module of a broader network management application.

The data dictionaries 12 preferably describe source commands and corresponding destination commands according to predefined assumptions and syntax rules. Each command preferably includes a series of keywords and parameters, and some command definitions include optional keywords and/or parameters. In some cases, one source command for the source device may translate into two or more destination commands for the destination device to implement the same functionality. In some cases, one or more source commands for the source device may not have any corresponding destination command(s) for the destination device (e.g. if a feature is not supported on the destination device). Based on these assumptions, a data dictionary syntax can be defined and used to describe the translation of any source script to any destination script.

In the exemplary embodiment, the configuration scripts are command line interface (CLI) configuration scripts having CLI commands, although other types or forms of commands are within the scope of the present invention. A CLI command basically includes a number of keywords and some parameters, where sections of the command may be recursive. For example, a CLI command to configure a T1/E1 channel group is described as follows:

channel-group number timeslots range [speed {56|64}]

The keywords in this command are shown in bold, while the parameters are shown in italics. The description of this command specifies that the range parameter can recur several times. For example, a valid command would be:

channel-group 2 timeslots 1-3, 5-7, 9-11, 13, 16, 18 speed 64

The exemplary data dictionary syntax rules and the manner in which the translator 14 interprets the data dictionary script language will now be described in greater detail followed by illustrative examples. Hypothetical CLI commands are used in the examples but should not be construed as actual CLI commands or as a limitation on the present invention.

Each of the data dictionaries 12 includes dictionary entries describing source commands (i.e., a source command block) used by the source device and the corresponding destination commands (i.e., a destination command block) used by the destination device. Information in the data dictionary is case insensitive. For any CLI command being described, the keywords are listed as is in the dictionary. Any parameters are indicated using a "%" symbol, followed by a character indicating the parameter type. The defined types include %s for strings, %a for IP addresses & masks; %x for a hexadecimal number; %d for a decimal number; and %m for mapping parameters (See Example 10). To uniquely identify a parameter within a command, a number is appended to the type character described above. For example, a command containing two hexadecimal numbers would use %x1 to describe the first parameter and %x2 to describe the second parameter. If a parameter can take a specific set or range of values, this is indicated by providing the range enclosed in "<" and ">" after the parameter name (see Example 2).

A parameter name that is used both in the source command and in one or more of the destination commands means that the parameter value is to be copied into the destination command (See Example 1). A parameter name in a destination command (e.g. %s2) that has no counterpart in the source command results in a failure to translate. The type description of a parameter is used to resolve possible ambiguous commands. For example, if there is a command that has a different meaning depending on the parameter, the indicated type can be used to determine the correct command at translation time. There is preferably no further processing of the type field beyond resolving ambiguous commands. This implies that if the dictionary maps command-x %d1 to command-y %d1 and the script contains command-x somenumber, the translator output will be command-y somenumber.

Any portion of a CLI command that can occur more than once (such as the range parameter in the channel-group command example above) is enclosed within a "^" symbol to define a recursive block. A recursive block of a CLI command can be separated by either a comma or a space (See Examples 4 and 5). This is indicated by adding a comma in the block specification. For example, ^port %d1^ indicates that the specified block can occur many times as port 1 port 2 port3 etc. If the entry was specified as ^port %d1,^, the final comma indicates that the command syntax is port 1, port 2, port 3 etc. Recursive command blocks cannot be nested.

If a command contains optional parameters, they are enclosed in square brackets. CLI commands with optional parameters are internally expanded into all the possible combinations of optional parameters (See Example 7). If an argument is optional in the source command, it is also optional in the destination command. Only those combinations in which all required destination command arguments are found in the source command are taken into account. In one example, commands can only contain up to 32 optional parameters, and nested optional blocks are allowed (See Examples 8 and 9).

It is possible that a parameter in the source command needs to be manipulated before being put in a destination command. For example, if one command takes a port number as an argument (port %d1), and the port numbering scheme is different for the destination device in that all port numbers are offset by 1000, this can be specified by including a mathematical expression in the destination command (See Example 3). All such expressions are enclosed in "&" symbols (dest port &%d1+1000&). Mathematical expressions enclosed in "&" are preferably only found in destination commands and contain parameters of type %d or %x only. Such expression blocks cannot contain optional or recursive arguments. If at least one of the arguments in the expression are of type hex (%x1), the result will also be in hexadecimal.

If a destination command block contains a sentence that starts with the word "$prompt", this indicates that the user will be prompted to enter the necessary CLI command (See Example 11). If a destination command block contains a sentence that starts with the word "$password", the user will be prompted to enter a username/password (see Example 12). Any destination commands that start with the word "$ignore" will be ignored. This can be useful for commands with optional parameters as will be illustrated later. Any comments that are found in the original script are preferably copied to the translated version as is. Any commands that could not be translated are preferably copied into the destination script as a comment, with an additional line above it indicating the error, or reason the translation was not done.

The above syntax rules can be used to describe essentially any CLI command and provide a mapping to the corresponding destination command using the same syntax. However, it is possible that there will not always be a one-to-one mapping between commands. It may happen that a single CLI command for device X could translate into a series of corresponding CLI commands for device Y. In order to accommodate this possibility, a destination command block containing a sequence of destination commands can be defined using block delimiters. After the description of a CLI source command in the dictionary, for example, the symbols "begin;" and "end;" can be used to denote the beginning and end of a destination command block, containing the sequence of destination CLI commands. These block delimiter symbols are preferably on a line by themselves.

Based on these syntax rules, below is an example of a dictionary entry for a fictional channel group command.

```
channel-group %d1 timeslots ^%s1^ [speed %d2<56,64>]
begin;
    define channel-group %d1
    assign timeslots ^%s1^ to channel-group %d1 [with speed %d2]
end;
```

It is possible that a command that contains a recursive argument may need to be translated into a series of CLI commands each taking a single instance of that parameter. The example below describes this case, again using fictional CLI commands for illustration purposes.

Original command:
create-users tom tomspasswd, bob bobspasswd, marie mariespasswd Desired translation:
Create user tom
Create user bob
Create user marie
Assign password tomspasswd to user tom
Assign password bobspasswd to user bob
Assign password mariespasswd to user marie Such a rule is described in the dictionary by leaving out the recursive symbol (^) from the destination command as follows:

```
Create-users ^%s1 %s2^
Begin;
    create user %s1
    assign password %s2 to user %s1
end;
```

By leaving out the "^" symbol in the destination command(s), the translator will repeat the destination command once for each occurrence of the block enclosed in the "^" symbols.

This section contains examples of dictionary entries and explains how the translator treats them internally. All of the CLI commands illustrated in these examples are for illustration purposes only and are not intended to limit the invention in any way.

EXAMPLE 1

Parameter Matching

```
Set interface %d1 speed %d2
Begin;
    Interface %d1 has speed %d2
End,
```

The above block shows how a source command is translated into the corresponding destination command. The values of the arguments %d1 and %d2 are copied from the original command into the destination command. If the line being translated is set interface 2 speed 5, the resulting output will be interface 2 has speed 5.

EXAMPLE 2

Parameter Ranges

```
Set interface %d1<1..5,10..15,17,19,21>speed %d2
Begin,
    Interface %d1 has speed %d2
End,
```

The above example is identical to the first one, with the exception that the argument %d1 can only take on the values indicated in the range indicated. As shown, values can include ranges, or single values separated by a comma. In this case, if the line being translated is set interface 2 speed 5, the resulting output will be interface 2 has speed 5. If the command being translated is set interface 6 speed 5, the translation will result in an error since interface number 6 is not in the range of valid values.

EXAMPLE 3

Mathematical Expressions

```
Set interface %d1 speed %d2
Begin;
    Interface &%d1+1000& has speed %d2
End,
```

The above example has the same results as the previous cases, except that in the destination command, the value of argument %d1 is offset by 1000. Any valid mathematical expression could be used including addition, subtraction, multiplication and division.

EXAMPLE 4

Recursive Arguments

```
Set interface ^%d1^ speed %d2
Begin,
    Interface ^%d1^ has speed %d2
End;
```

The above example uses the recursive block syntax (^) to specify that an argument can be found more that once in the command. For example, a valid command could be set interface 1 2 3 4 5 6 7 speed 5000. In this case the destination command would be interface 1 2 3 4 5 6 7 has speed 5000.

EXAMPLE 5

Comma Delimited Recursive Arguments

```
Set interface ^%d1^ speed %d2
Begin;
    Interface ^%d1,^ has speed %d2
End,
```

Notice that the recursive argument specification in the destination command contains an extra comma at the end. This is an indication to the translator that when copying the argument values to the destination command, they must be comma separated. In this case, the command set interface 1 2 3 4 5 6 7 speed 5000 would translate into interface 1, 2, 3, 4, 5, 6, 7 has speed 5000.

EXAMPLE 6

Expanding Recursive Arguments

```
Set interface ^%d1^ speed %d2
Begin,
    Interface %d1 has speed %d2
End;
```

In the above example, the argument %d1 is enclosed in a recursive block in the source command, but not in the destination command. This indicates that the destination command must be repeated several times, once for each instance of the argument. For example, the command set interface 1 2 3 4 5 6 7 speed 5000, would result in the following output:

interface 1 has speed 5000
interface 2 has speed 5000
interface 3 has speed 5000
interface 4 has speed 5000
interface 5 has speed 5000
interface 6 has speed 5000
interface 7 has speed 5000

EXAMPLE 7

Optional Arguments

```
Set interface ^%d1^ speed %d2 [encapsulation %s1]
Begin;
    Interface %d1 has speed %d2 [with encapsulation %s1]
End,
```

In the above command, the parameter encapsulation %s1 is indicated to be optional. In this case, the translator expands this to contain both forms of the command, so the above entry is equivalent to having the following:

```
Set interface ^%d1^ speed %d2
Begin;
    Interface %d1 has speed %d2
End,
Set interface ^%d1^ speed %d2 encapsulation %s1
Begin;
    Interface %d1 has speed %d2 with encapsulation %s1
End,
```

In this case, the command set interface 1 speed 5000 is translated into interface 1 has speed 5000 based on the first rule. The command set interface 1 speed 5000 encapsulation ppp will be translated into interface 1 has speed 5000 with encapsulation ppp based on the second rule.

EXAMPLE 8

Nested Optional Arguments

```
Set interface ^%d1^ speed %d2 [encapsulation %s1 [state %s3]]
Begin;
    Interface %d1 has speed %d2 [with encapsulation %s1 [state %s3]]
End;
```

The above source command has nested optional parameters. In this case the command is again expanded into all its possible forms as illustrated below:

```
Set interface ^%d1^ speed %d2
Begin;
    Interface %d1 has speed %d2
End,
Set interface ^%d1^ speed %d2 encapsulation %s1
Begin;
    Interface %d1 has speed %d2 with encapsulation %s1
End;
Set interface ^%d1^ speed %d2 encapsulation %s1 state %s3
Begin;
    Interface %d1 has speed %d2 with encapsulation %s1 state %s3
End,
```

EXAMPLE 9

Nested Optional Arguments Expansion

```
Set interface ^%d1^ speed %d2 [encapsulation %s1 [state %s3]]
Begin:
    Interface %d1 has speed %d2 [with encapsulation %s1 state %s3]
End;
```

The above example is identical to the previous one, except that in this case the argument start %s3 is optional in the source command but not in the destination command. In this case, the possible combinations are:

```
Set interface ^%d1^ speed %d2
Begin;
    Interface %d1 has speed %d2
End,
Set interface ^%d1^ speed %d2 encapsulation %s1 state %s3
Begin;
    Interface %d1 has speed %d2 with encapsulation %s1 state %s3
End,
```

All other combinations are ignored by the translator since the arguments found in the source command must always match the arguments in the destination command(s).

EXAMPLE 10

Mapping

```
interface %m1 set encapsulation %s1
begin;
    begmap,
    %m1
        FastEthernet0 |         FastEthernet0/0/0
        FastEthernet1 |         FastEthernet0/0/1
        serial 1 |              Serial0/0/0
    other %d1 |                 myOther &%d1 + 100&
    endmap,
    interface %m1 encapsulate %s1
end,
```

This command uses the concept of mapping. In the source command, there is a portion of the command that needs to be mapped to something different for the destination command. This is accomplished by using the mapped type (%m1), and then specifying the mapping within the command block. For each of the mapped parameters found in the source command, there is preferably a map description block located within the command description. A map description block has the following syntax:

```
begmap;
    mapname (e.g. %m1 or %m2 etc)
        source string | destination string
    endmap,
```

The translator will then expand the command into as many versions as there are mappings, in this case:

```
Interface FastEthernet0 set encapsulation %s1
Begin;
    Interface FastEthernet0/0/0 encapsulate %s1
End,
Interface FastEthernet1 set encapsulation %s1
Begin;
    Interface FastEthernet0/0/1 encapsulate %s1
End,
Interface serial 1 set encapsulation %s1
Begin;
    Interface serial 0/0/0 encapsulate %s1
End,
Interface other %d1 set encapsulation %s1
Begin,
    Interface myOther &%d1 + 100& encapsulate %s1
End;
```

Once the command has been expanded, the usual translation rules are then applied.

EXAMPLE 11

Prompting for User Input

```
Command xyz
Begin,
    $prompt !Please enter the commands to implement Command xyz
End,
```

In the above example, when the translator encounters the given command in the CLI source file, the user will be prompted with whatever string follows the "$prompt" keyword, and given the option to enter one or more CLI commands.

EXAMPLE 12

Passwords

```
Create user %s1 with password %s2
Begin;
    $password
    $ignore %s1 %s2
End,
```

User/password commands are an example of a command that cannot automatically be translated, since the passwords stored in CLI configuration files are typically encrypted. Using the "$password" keyword, the translator is informed that it must provide the user with a way to enter a username/password. Note that the $ignore keyword is used here to ensure that the translator does not mind that the parameters %s1 and %s2 that are a part of the source command are not used anywhere in the destination command(s).

Figure 2:
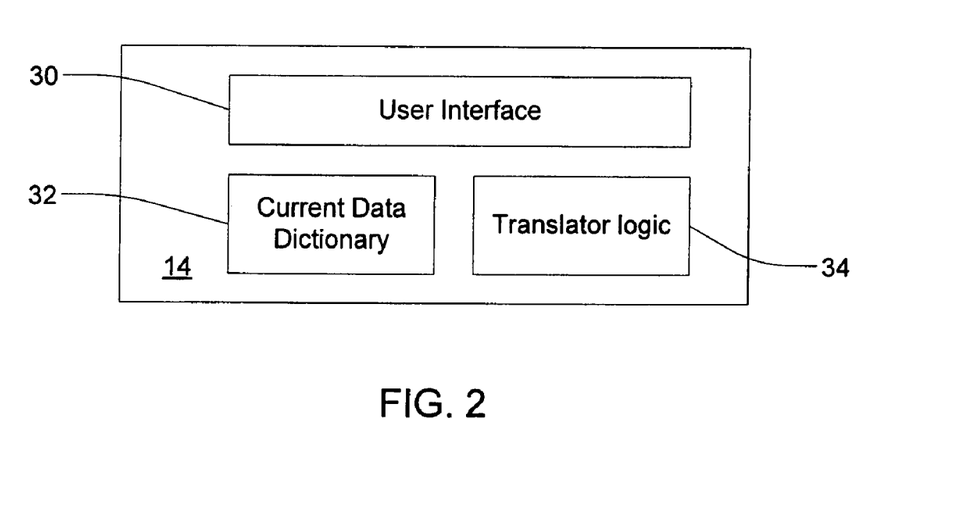
FIG. 2 is a simplified representation of the primary components of the translator used in the translator system, according to one embodiment of the present invention.

With reference to FIG. 2, one embodiment of the translator 14 of the present invention includes three major components: a user interface module 30, a current data dictionary module 32, and a translator logic module 34. The user interface module 30 contains code that is related to the translator user interface such as functions for prompting the user for input and providing feedback relating to the translation process. The current data dictionary module 32 creates the internal representation of the information contained in the data dictionary that was selected by the user based on the source device from which the script was obtained, and the destination device for which it is being translated. The translator logic module 34 contains code that processes the source configuration script and accesses the information stored in the current data dictionary to produce the translated version or destination configuration script.

The user interface module 30 is preferably a simple module provided so that all user-interface-related functionality can be found in one central location, allowing the translator to be easily ported to different platforms. One embodiment of the user interface module 30 includes a single user interface class (TranslatorUI). This class provides methods required to prompt the user for any input required during the translation process. In addition, it provides the necessary functions that can be used by the translator logic module 34 to display information regarding the status of the translation process.

Figure 3:
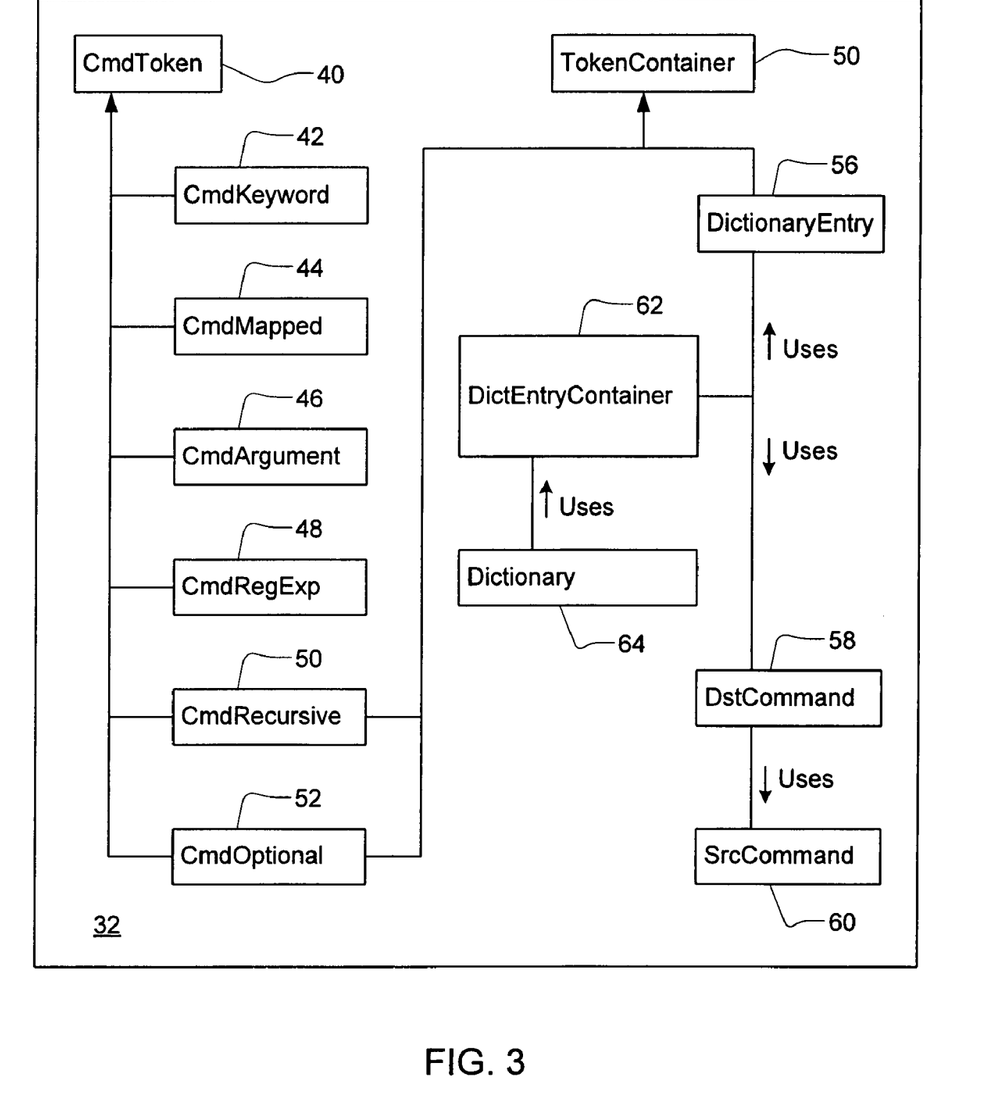
FIG. 3 is a simplified representation of an exemplar data dictionary module of the translator system of the present invention.

With reference to FIG. 3, a class diagram of the current data dictionary module 32 is shown. According to one embodiment of the current data dictionary module 32, the functionality is implemented using the classes described in greater detail below.

As described above, each CLI command is considered to be composed of a set of keywords, arguments, regular expressions, and other elements. A class is used to represent each of the elements comprising a CLI command such that each command is converted into command tokens (i.e., tokenized) in the internal representation of the current data dictionary. The base class for all of the elements or command tokens is the command token class (CmdToken) 40. It contains some virtual functions to determine the token type and contents.

A token container class (TokenContainer) 50 is used as a base class to any other classes that can contain lists of command tokens or any of its derived classes.

A command keyword class (CmdKeyword) 42 is used to represent any keywords that are found in a CLI command. It inherits from CmdToken and provides the same basic functionality.

A command mapped class (CmdMapped) 44 is used to represent a mapped type as described in Example 10 above. It inherits from CmdToken and additionally contains a table describing the mappings described in the dictionary.

A command argument class (CmdArgument) 46 is used to represent arguments found in CLI commands. It inherits from CmdToken and additionally contains parameter range information.

A command regular expression class (CmdRegExp) 48 is used to represent regular (mathematical) expressions found in the data dictionary. It inherits from CmdToken and provides additional functions to evaluate a regular expression.

A command recursive class (CmdRecursive) 50 is used to represent a recursive portion of a CLI command description. It inherits from CmdToken. Since a recursive block can contain a number of tokens, this class also inherits from TokenContainer. In addition to inherited functionality, it contains a list of tokens that can be found in the recursive block and the recursive block delimiter (comma or space).

A command optional class (CmdOptional) 52 is used to represent a part of a CLI command description that is enclosed in square brackets, meaning that it is an optional parameter. It inherits from CmdToken. Since an optional block in a CLI command description can contain a number of tokens, this class also inherits from TokenContainer. In addition to inherited functionality, this class contains a list of tokens found in the optional command block.

A dictionary entry class (DictionaryEntry) 56 is used to represent a single CLI command description found in the current data dictionary. Note that this class is used to describe both source and destination CLI commands. It contains a method through which a CLI command description can be passed. The DictionaryEntryclass converts the provided command into a series of tokens as described above, and stores the information hierarchically in a list.

A destination command class (DstCommand) 58 is used to represent a series of CLI commands. A single source CLI command may map to a number of destination CLI commands. This "group" of destination commands is contained in a single DstCommand instance. This object contains methods to allow a new CLI command description to be added to the group. It also provides a function to test whether a given source command can be mapped to the contained group of destination commands by verifying that all required parameters exist. It further provides a translate method which produces the result given an existing CLI source command.

A source command class (SrcCommand) 60 is used to represent a CLI command that is read from the source CLI script. It can take a CLI command string and convert it into a series of tokens for internal representation. It also provides some methods to check for necessary arguments and to check whether it maps to a given source script command line.

A dictionary entry container class (DictEntryContainer) 62 is used to represent a complete entry described in the data dictionary. It links an instance of DictionaryEntry containing a source command description, with an instance of DstCommand containing the corresponding set of destination command descriptions.

A dictionary class (Dictionary) 64 is used to contain the internal representation of all the information contained in the data dictionary script file. It contains a list of DictEntryContainer objects. It provides functions to add entries, to sort the dictionary alphabetically by source command string, to load a data dictionary from a file descriptor, and to locate an entry (using binary search) that maps to a specific source command string. When loading a data dictionary, all entries that contain mapped arguments or optional components are automatically expanded into a number of entries.

Figure 4:
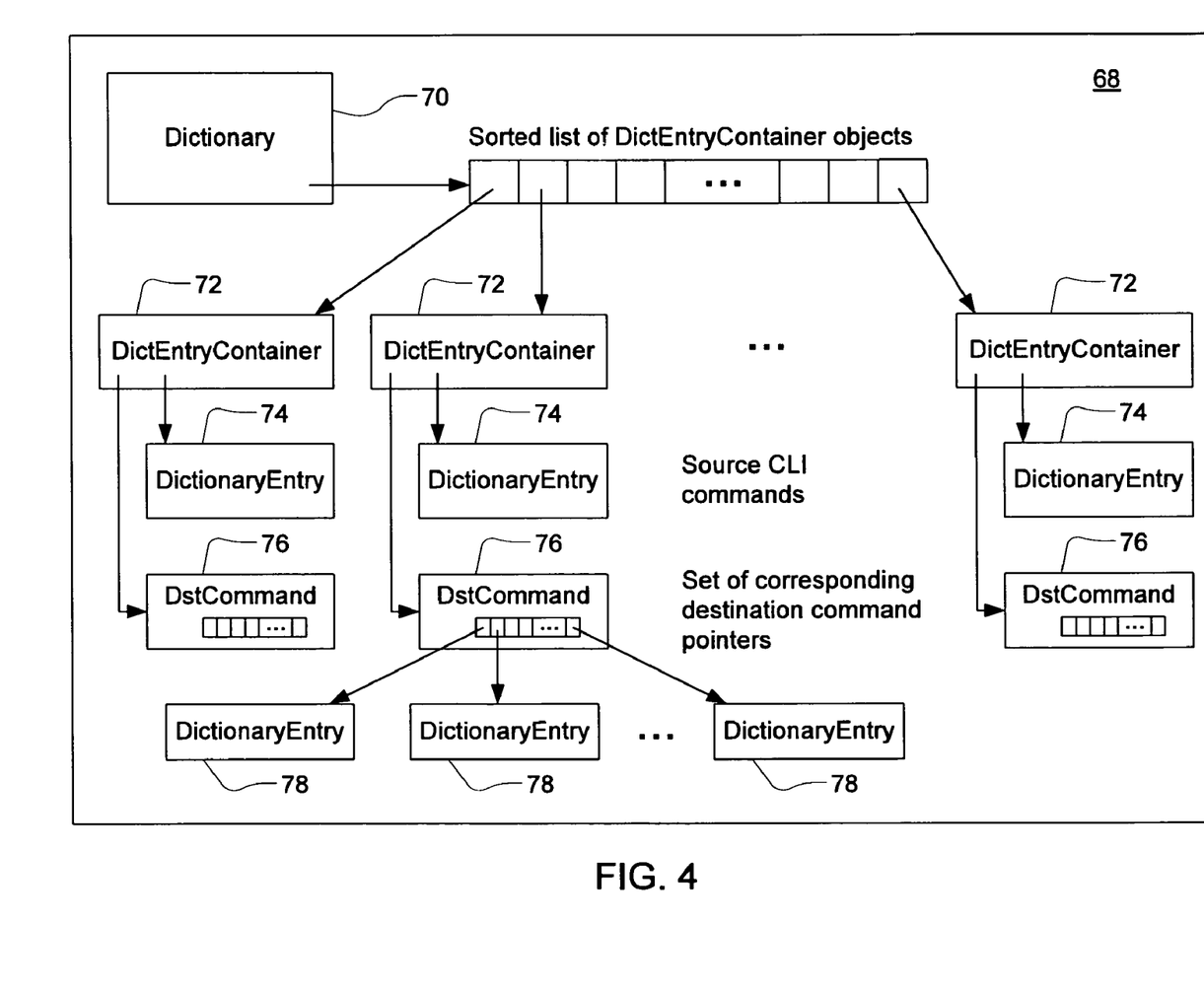
FIG. 4 is a simplified representation of the functional arrangement of an exemplar data dictionary internal representation created using the translator system of the present invention.

The above classes are used to represent the information contained in the current data dictionary. The data structures forming the internal representation 68 of the data dictionary are shown in FIG. 4. A dictionary object 70 is created for the current data dictionary. Each command described in the current data dictionary is expanded into one or more DictEntryContainer objects 72. Each such DictEntryContainer object 72 contains a pointer to a DictionaryEntry object 74 representing the source command and a pointer to a DstCommand object 76, which contains a list of DictionaryEntry objects 78 representing the group of corresponding destination commands. In the exemplary embodiment, the Dictionary object 70 is a singleton and only one data dictionary can be loaded into memory at any given moment. After all the commands described in the data dictionary have been represented in memory using the above objects, the Dictionary is ordered alphabetically by source command string. This allows a binary search algorithm to be used when searching through the dictionary for entries matching a given command.

The translator logic module 34 (FIG. 2) contains the functionality needed to implement the translation logic. Based on user input, it loads the appropriate data dictionary files and makes the necessary calls to build the internal data structures. When a CLI script is selected for translation, it makes the necessary calls to load each command, search through the dictionary to find the matching entry, and generate the appropriate output based on the source CLI command and the destination dictionary entries. One embodiment of the translator logic module 34 includes a single class (Translator) that provides the functions described in detail below.

In one example, the translator software is created using an object oriented programming language, such as C++. Other software implementations of the translator modules and other forms of data structures for representing the current data dictionary are also within the scope of the present invention. In one example, the translator software is run offline on a host PC, although other implementations are contemplated.

Figure 5:
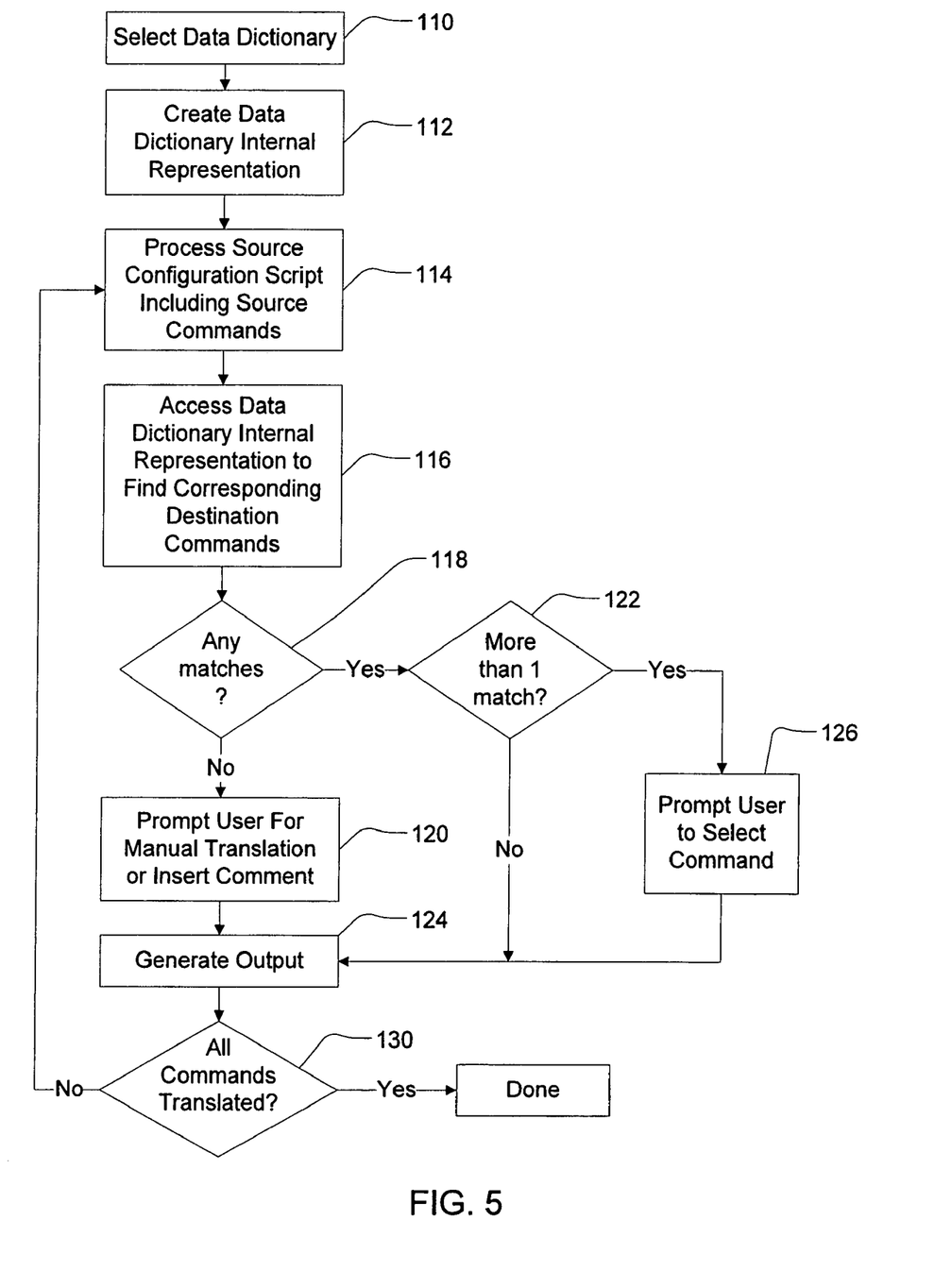
FIG. 5 is a flow chart illustrating one method of translating a source configuration script into a destination configuration script, according to the present invention.

Referring to FIG. 5, one method of translating a configuration script into a destination script is described in greater detail below. The first step in a translation is to select the dictionary that must be used, step 110. The specific dictionary selected is based on the type of device for which the existing CLI script was created and the type of device for which it is being translated. Once the appropriate dictionary is selected by the user, the Translator class reads the text file and builds the internal representation 68 of the current data dictionary (FIG. 4), step 112. When a dictionary entry is read from the data dictionary file, the source CLI command is first converted into a sequence of tokens which are put into a DictionaryEntry object 74. Any ranges that are encountered in the source command string are encapsulated in a CmdArgument object that is created to represent the given argument. Once the DictionaryEntry object describing the source CLI command has been created, it is inserted into a DictEntryContainer object 72.

The Translator class then proceeds to load the destination CLI commands that are found between the "begin;" and "end;" block delimiters of the dictionary entry. Each destination CLI command is tokenized in the same way as described above, and the tokens are used to construct the corresponding DictionaryEntry object 78. Each of the destination CLI commands is represented by a single DictionaryEntry object 78. The DictionaryEntry objects 78 that correspond to the destination CLI commands are grouped together by inserting them into a DstCommand object 76. This DstCommand object 76 is then inserted into the DictEntryContainer object 72 created in the first step, thus establishing the link between the source CLI command and the group of destination CLI commands in a dictionary entry. Each such DictEntryContainer object 72 is inserted into the global Dictionary object 70, so that after all the entries in the dictionary text file have been processed, the data dictionary internal representation data structure is populated.

Once the complete dictionary has been loaded into memory as described above, the source configuration script is processed, step 114. The Translator class reads the CLI script file to be translated line by line and translates each of the CLI commands found. The first step is to convert the source CLI command into a series of tokens using the SrcCommand class. Once that is done, the data dictionary internal representation is accessed to find corresponding destination commands, step 116. The first token is extracted from the series of source command tokens, and the dictionary data structure is searched to find an entry that begins with the same token. Since the dictionary data structure is alphabetically ordered, a binary search algorithm is applied. It is possible that there are several forms of a command that begin with the same keyword. For this reason, when the binary search algorithm terminates, a sequential search is performed to find the first and last dictionary entries that begin with the desired token.

This search results in a group of dictionary entries that may potentially be used to translate the original CLI command. For each of these potential dictionary entries, the Translator class attempts to match the tokenized source CLI command to the tokens in the dictionary entry, step 118. If the tokens match, a reference to the dictionary entry is kept, otherwise it is ignored. At the end of this process, if there are no dictionary entries left, the Translator class calls the appropriate TranslatorUI method that either prompts the user asking for manual translation or inserts a comment into the output script indicating that the command could not be translated (depending on application options), step 120. If the search process yields exactly one dictionary entry, step 122, the commands contained in that entry's DstCommand object 76 are used to generate the appropriate output, step 124. If more than one dictionary entry matches the CLI command, the TranslatorUI class is called which presents the available options and prompts the user to select the dictionary entry to use for the translation, step 126. The commands contained in the DstCommand object 76 of the selected entry are then used to produce the output, step 124. This process is repeated for each command in the source CLI script until all commands have been translated, step 130.

In summary, the CLI translation system 10 of the present invention provides users with the ability to translate CLI configuration scripts intended for one specific type of device, into scripts that provide the same functionality (where possible) but use the CLI syntax of a different type of device. This makes the process of upgrading network infrastructure much simpler, since it automates what was before a tedious and time consuming task. The translation system 10 allows a user to take an existing CLI configuration script, specify the device for which it was created, select the device on which it is to be loaded, and the translator will generate a new script for the specified destination device.

Modifications and substitutions by one of ordinary skill in the art are considered to be within the scope of the present invention, which is not to be limited except by the following claims.

The invention claimed is:

1. A configuration file translation system for translating at least one source configuration script for a source device to at least one destination configuration script for a destination device, said system comprising:
    at least one data dictionary comprising a plurality of dictionary entries, each of said dictionary entries comprising at least one source command and at least one destination command corresponding to each said source command, wherein said source command includes at least one source command keyword and at least one parameter, and wherein said destination command corresponding to said source command includes at least one destination command keyword and said at least one parameter; and
    a translator for reading source commands in said source configuration script, finding corresponding destination commands in said data dictionary, and translating said source commands in said source configuration script to said corresponding destination commands to create said destination configuration script.

2. The configuration file translation system of claim 1 wherein at least one of said dictionary entries includes a plurality of destination commands corresponding to one source command, wherein said destination commands are arranged in a destination command block in said at least one of said dictionary entries.

3. The configuration file translation system of claim 2 wherein said destination command block includes block delimiters.

4. A configuration file translation system for translating at least one source configuration script for a source device to at least one destination configuration script for a destination device, said system comprising:
    at least one data dictionary comprising a plurality of dictionary entries, each of said dictionary entries comprising at least one source command and at least one destination command corresponding to each said source command; and
    a translator for reading source commands in said source configuration script, finding corresponding destination commands in said data dictionary, and translating said source commands in said source configuration script to said corresponding destination commands to create said destination configuration script, wherein said translator comprises;
    a user interface module for prompting a user for input during a translation process and for displaying information to said user during said translation process;
    a current data dictionary module for creating an internal representation of information in a current data dictionary selected from said at least one dictionary based on a source device and destination device; and
    a translator logic module for processing a source configuration script corresponding to said source device and for accessing said internal representation of information of said current data dictionary to produce a corresponding destination configuration script for said destination device.

5. The configuration file translation system of claim 4 wherein said current data dictionary module comprise command classes for representing elements of commands in said current data dictionary and in said source configuration script being translated.

6. The configuration file translation system of claim 4 wherein said current data dictionary module comprises a dictionary entry class for representing commands in said current data dictionary, and a source command class for representing a source command in said configuration script being translated.

7. A method for translating at least one source configuration script for a source device to at least one destination configuration script for a destination device, said method comprising:
    providing a user interface for prompting a user for input including during a translation process and for displaying information to said user and accepting input from the user;
    selecting a data dictionary based on said source device and said destination device, said data dictionary describing source commands for said source device and corresponding destination commands for said destination device;
    creating a data dictionary internal representation of said data dictionary selected;
    processing a source configuration script including source commands for said source device;
    accessing said data dictionary internal representation for destination commands corresponding to said source commands in said source configuration script; and generating a destination configuration script including said destination commands corresponding to said source commands in said source configuration script; and writing the destination configuration script to said destination device.

8. The method of claim 7 wherein creating said data dictionary internal representation comprises reading said data dictionary and creating objects containing said source commands, objects containing said destination commands, and objects containing elements of said source commands and said destination commands in said data dictionary.

9. The method of claim 8 wherein processing said source configuration script comprises reading said source commands in said source configuration script and creating objects containing said source commands in said source configuration script.

10. The method of claim 9 wherein accessing said data dictionary internal representation comprises searching for said objects containing said source commands in said data dictionary internal representation that match said objects containing said source commands in said source configuration script.

11. The method of claim 10 where said destination script is generated using said destination commands in said data dictionary internal representation associated with said source commands in said data dictionary internal representation matching said source commands in said source configuration script.

12. The method of claim 10 further comprising prompting a user for a manual translation when no matching commands are found.

13. The method of claim 10 further comprising inserting a comment into said destination configuration script when no match commands are found.

14. The method of claim 10 further comprising prompting a user to select one of a plurality of matching commands.

* * * * *